(12) United States Patent
Anderl et al.

(10) Patent No.: US 7,073,960 B2
(45) Date of Patent: Jul. 11, 2006

(54) COMPACT OPTICAL TRANSCEIVERS INCLUDING THERMAL DISTRIBUTING AND ELECTROMAGNETIC SHIELDING SYSTEMS AND METHODS THEREOF

(75) Inventors: William James Anderl, Rochester, MN (US); Scott Michael Branch, Rochester, MN (US); David Peter Gaio, Rochester, MN (US); Michael Francis Hanley, Rochester, MN (US); William K. Hogan, Rochester, MN (US); Howard Victor Mahaney, Jr., Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/304,130

(22) Filed: Dec. 15, 2005

(65) Prior Publication Data

US 2006/0098924 A1     May 11, 2006

Related U.S. Application Data

(62) Division of application No. 09/809,699, filed on Mar. 15, 2001.

(51) Int. Cl.
*G02B 6/36* (2006.01)
*H04B 10/00* (2006.01)
*H05K 7/20* (2006.01)

(52) U.S. Cl. .................. 385/92; 361/688; 437/57; 398/135

(58) Field of Classification Search .................. 385/92; 361/688; 437/57; 398/135
See application file for complete search history.

(56) References Cited

U.S. PATENT DOCUMENTS

| | | | | |
|---|---|---|---|---|
| 6,047,172 A | * | 4/2000 | Babineau et al. | 455/300 |
| 6,556,811 B1 | * | 4/2003 | Sayers et al. | 455/90.3 |
| 6,583,902 B1 | * | 6/2003 | Yuen | 398/135 |
| 6,856,769 B1 | * | 2/2005 | Steffensen et al. | 398/135 |

OTHER PUBLICATIONS

U.S. Appl. No. 09/809,531, entitled: Technique and Apparatus for Compensating for Variable Lengths of Terminated Optical Fibers in Confined Spaces.
U.S. Appl. No. 09/809,650, entitled: An Optical Fiber Coupler and an Optical Fiber Coupler Incorporated Within a Transceiver Module.
U.S. Appl. No. 09/809,127, entitled: High Frequency Matching Method and Silicon Optical Bench Employing High Frequency Matching Networks.

* cited by examiner

*Primary Examiner*—Sung Pak
*Assistant Examiner*—Tina M Wong
(74) *Attorney, Agent, or Firm*—James R. Nock

(57) ABSTRACT

An optical transceiver includes structures that define an electrical connector port for allowing connection of an electrical connector to an optical subassembly of the transceiver, and structures that define a vent surrounding at least portions of the connector port, whereby the vent allows bidirectional passage of air therethrough. Included in the transceiver are structures that define electromagnetic interference shielding and selectively transfer heat of heat generating electronic components by conduction to a transceiver housing. Methods of cooling the transceiver by ventilation and internal heat conduction are present.

20 Claims, 8 Drawing Sheets

COMPACT OPTICAL TRANSCEIVERS INCLUDING THERMAL DISTRIBUTING AND ELECTROMAGNETIC SHIELDING SYSTEMS AND METHODS THEREOF

REFERENCE TO PARENT APPLICATION

This patent application is a divisional of the co-pending patent application "COMPACT OPTICAL TRANSCEIVERS INCLUDING THERMAL DISTRIBUTING AND ELECTROMAGNETIC SHIELDING SYSTEMS AND METHODS THEREOF", Ser. No. 09/809,699 filed by Anderl et al. on Mar. 15, 2001, which is incorporated herein by reference.

CROSS-REFERENCE TO RELATED APPLICATIONS

The present application is related to the following commonly-assigned and copending U.S. Patent Applications: U.S. Ser. No. 09/809,650 entitled: AN OPTICAL FIBER COUPLER AND AN OPTICAL FIBER COUPLER INCORPORATED WITHIN A TRANSCEIVER MODULE; U.S. Ser. No. 09/809,531 entitled: TECHNIQUE AND APPARATUS FOR COMPENSATING FOR VARIABLE LENGTHS OF TERMINATED OPTICAL FIBERS IN CONFINED SPACES; U.S. Ser. No. 09/809,127 entitled: HIGH FREQUENCY MATCHING METHOD AND SILICON OPTICAL BENCH EMPLOYING HIGH FREQUENCY MATCHING NETWORKS; all filed concurrently herewith and all incorporated herein as a part hereof.

BACKGROUND OF THE INVENTION

The present invention relates generally to a laser-based data communication interconnect apparatus for effecting optical data transfer and, more particularly, to compact optical transceiver apparatus and methods having improved thermal distributing and electromagnetic interference shielding features.

Optical transceiver modules are known in the data transmission field for effecting bidirectional data transmission, whereby electrical signals are converted to optical signals and vice versa. In operation, a transmitter unit of the module functions to convert incoming electrical signals to corresponding optical signals. Conversely, incoming optical signals are converted by the module's receiving unit into corresponding electrical data signals. These modules are typically mounted on a circuit host card that is normally associated with a host computer, input/output device, switch, or other peripheral device.

In general, space saving concerns are important to end users desiring to use such modules in order to satisfy established or emerging standards as to a size or form factor. It will thus be appreciated that there is a commercial desire for relatively small and compact modules; especially those that are adapted to be integrated into a wide range of existing and evolving networking systems.

Not only are compactness concerns important for module design, but so are thermal management issues. This is because transceiver modules, in operation, tend to generate relatively significant amounts of heat. In fact, as data transfer rates increase, for example in the multi-gigabit range, so does the heat generated thereby owing to the higher amounts of power required. It will be appreciated, therefore, that the higher power needs and the desire for module compactness tend to increase the amount of excessive heat generated within a module having reduced space for its components.

Not only do the smaller confines of a reduced sized module impact negatively on overall thermal management issues in a general sense, but such compactness places some of the module's components that operate at relatively high temperatures even closer to components that must operate at cooler temperatures, for optimal performance reasons, thereby adversely affecting the performance of the latter. For instance, in order to maintain high performance reliability for a module's laser diode, it should be kept relatively cooler than its associated driver; the latter of which tends to operate at much higher temperature ranges. Accordingly, significant and opposing design constraints are imposed on the manufacture and reliable operation of such transceivers considering the countervailing demands for more powerful transceiver components and end user demands for module compactness satisfying industry standards.

Many known transceiver modules when mounted to an opening of a data system bulkhead tend to block the passage of cooling air therethrough. This blockage is, in part, necessitated by the desire of shielding against excessive electromagnetic interference emissions emanating from such opening. The blockage creates, however, a tendency for the interior space of the data system which houses the module to overheat, thereby lessening the effectiveness of a module's internal cooling approach. Such blockages additionally place heating burdens on the data system itself. This is especially troublesome to end users when they desire more powerful transceiver modules because existing data systems may not be able to effectively cool the additional heat being added thereto.

As a result, emphasis is being placed on the utilization of heat sinks and other means for managing heat issues arising from transceiver use. Known attempts at addressing the heating problems in transceivers of this type include those described in commonly-assigned U.S. Pat. No. 5,757,998; issued to R. Johnson et el. This patent describes an optical transceiver having a cover and several components of the module serving as heat sinks. Also, insofar as electromagnetic interference is concerned, known attempts at addressing the need for a low cost and reliable approach for the reduction of electromagnetic interference emissions when mounting a transceiver to a wall opening include those described in commonly-assigned U.S. Pat. No. 6,085,006; issued to D. Gaio et al. This patent describes an optical transceiver having an external electromagnetic interference shield that slides over a module end portion that encloses an optical fiber connection assembly. The shielded end portion is retained in an opening of an associated data system for allowing connectors to be connected thereto.

While the known approaches have been successful concerning controlling thermal and electromagnetic interference issues, there is, nevertheless, a continuing desire to improve upon the control of such issues effectively. For without improvements regarding effective thermal and electromagnetic interference emission control management; especially in a compact and cost-effective manner, the ability of such transceivers to maintain reliable optimal performance characteristics in a commercially viable manner will continue to be limited.

SUMMARY OF THE INVENTION

It is, therefore, a principal aspect of the present invention to continue to improve upon the thermal management control problems that arise in optical transceivers.

It is, therefore, another principal aspect of the present invention to continue to improve upon the electromagnetic interference issues that arise in optical transceivers.

It is another aspect of the present invention to continue to improve the thermal and electromagnetic interference management of a data transfer system that uses an optical transceiver.

It is another aspect of the present invention to continue to improve upon thermal management control problems through effective convective cooling of the heat generating components.

It is another aspect of the present invention to continue to improve upon thermal management control problems through effective and selective cooling of the heat generating components.

It is yet another aspect of the present invention to provide a method of cooling an optical transceiver that is mountable to an opening in a wall portion while providing the necessary electromagnetic interference shielding.

It is yet another aspect of the present invention to provide thermal and electromagnetic interference mechanisms that effectively integrate electromagnetic interference and thermal control solutions.

It is another aspect of the present invention to provide thermal and electromagnetic interference mechanisms that achieve the foregoing aspects in a compact packaging arrangement.

It is yet another aspect of the invention to provide a heat sink portion external to a wall opening operating at temperature lower than heat sink portions mounted within the wall opening.

It is still another aspect of the invention to use external heat sink portions for cooling of an optical subassembly including its laser device.

It is yet another aspect of the present invention to achieve the foregoing aspects in a simple, reliable and low-cost manner.

In regard to achieving the foregoing aspects and further in regard to improving over the prior art especially in connection with the issues raised above, the present invention makes provisions for a method of cooling an optical transceiver that is mountable in a wall opening. The method comprises the steps of: providing an optical transceiver having at least one end portion that is insertable within the wall opening; and, ventilating ambient air over a major surface portion of the optical transceiver by mounting the one end portion to the wall opening so that at least one vent is formed within the confines of the wall opening which allows air to pass therethrough and over the major surface portion of the optical transceiver. In addition, such a method comprises the step of: shielding the optical transceiver, the vent, and the wall opening from electromagnetic interference.

Further consistent with achieving the foregoing aspects and improving on the prior art the present invention makes provisions for a optical transceiver comprising: a housing assembly including a carrier member and a heat sink cover member coupled to a portion of the carrier member to define at least a portion of an enclosure therewith; an optical subassembly including an electro-optical transmitter unit positioned within the enclosure; a retainer assembly mounted on a first end portion of the carrier member and enclosing portions of the optical subassembly; the retainer assembly including a first set of structures which, in combination, with the carrier member define at least one electrical connector port for allowing connection of an electrical connector to the optical subassembly, the retainer assembly including a second set of structures which, in combination, with the carrier member define at least one vent surrounding portions of the connector port, wherein the vent allows bidirectional passage of air therethrough, such that air can easily pass generally over a substantial surface portion of the housing assembly; and, an electromagnetic interference assembly connected to at least peripheral portions of the second set of structures and at least peripheral portions of the first end portion for releasably coupling the optical transceiver to an opening of a wall.

In an illustrated embodiment, the electromagnetic interference assembly includes a frame having a plurality of spaced apart and flexibly resilient retaining tabs extending therefrom. The tabs allow the optical transceiver to be inserted into the wall opening and be releasably retained thereby. The electromagnetic interference assembly is made of an electrically conductive material which reduces electromagnetic interference emissions of the optical transceiver. The screen assembly is coupled to the optical transceiver so as to be positioned adjacent to and in covering relationship to at least a portion of the vent. The screen assembly has a plurality of screen openings for allowing passage of air therethrough and reducing emission of electromagnetic interference.

Further consistent with achieving the foregoing aspects and improving on the prior art the present invention makes provisions for an optical transceiver comprising: a housing assembly including a carrier member and a heat sink cover member joined together to define a portion of an enclosure therebetween; an optical subassembly within said enclosure, the optical subassembly comprises an electro-optical transmitter unit including a first electronic device which operates at a first temperature range and a second electronic device which operates at a second temperature range that is higher than the first temperature range. The first electronic device is thermally coupled to an internal surface of the carrier member so as to transfer heat thereof by conduction to the carrier member. The second electronic device is mounted on a substrate located within the enclosure which substrate is not in direct thermal contact with the carrier member. A thermally conductive unit thermally couples the second electronic device to an internal wall of the heat sink cover member in a manner so as to transfer heat by conduction from the second electronic device to the heat sink cover member and away from the first electronic device, whereby the first electronic device is maintained cooler than the second electronic device.

BRIEF DESCRIPTION OF THE DRAWINGS

For a more complete understanding of the present invention, reference is now made to the following detailed description of a preferred embodiment of the present invention illustrated in the accompanying drawings in which.

DETAILED DESCRIPTION

Figure 1:
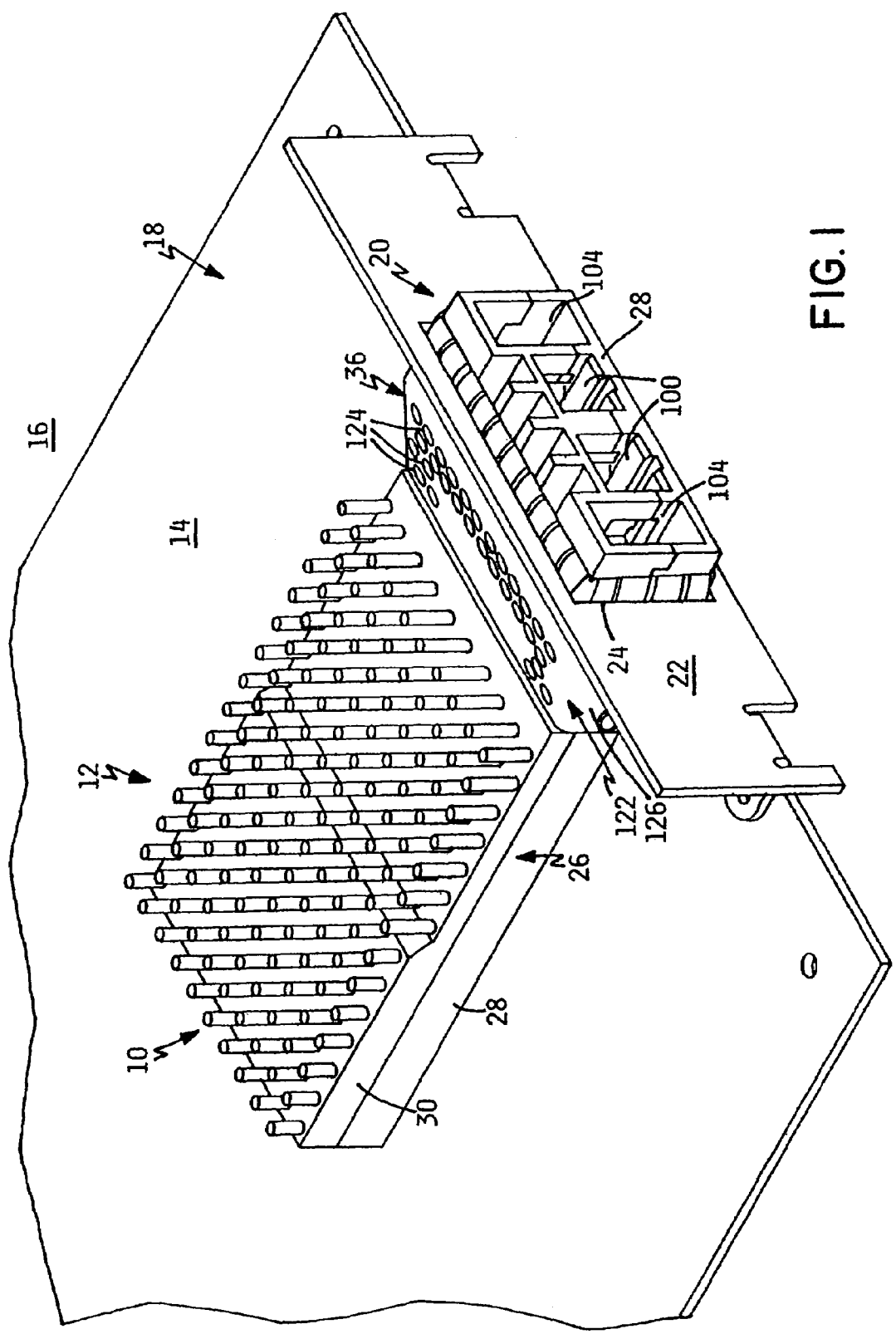
FIG. 1 is a perspective view, with portions broken away, of an optical transceiver module made according to the present invention being mounted on a host circuit card of a data transfer system.

FIGS. 1–8 illustrate one preferred embodiment of an optical transceiver module made according to the principles of the present invention and designated by reference numeral 10. As illustrated in FIG. 1, the optical transceiver module 10 has a first or proximal end portion 12 mounted directly on a host circuit card 14 of a known type that is within a space 16 formed by a host data transfer system 18, such as a mid-range computer system commercially available from International Business Machines Corporation. Other types of data transfer or communication systems are contemplated for use with the transceiver module of the present invention, such as input/output devices, or other peripheral devices. The proximal end portion 12 of the optical transceiver module 10 is otherwise attached to the host card by suitable attaching elements, such as screws (not shown). A distal or connector end portion 20 of the module is releasably coupled to a system wall 22 in a manner to be described after being inserted into a system access opening 24. In this embodiment, the connector end portion 20 is configured to be coupled to a suitable push-pull duplex "SC" connector (not shown) in a known manner. While a duplex "SC" type connection is envisioned, a comparable end portion cooperable with other known connectors, such as for example, a single "SC" connector, a "LC" connector, or a "MT-RJ" connector can be used.

Figure 2:
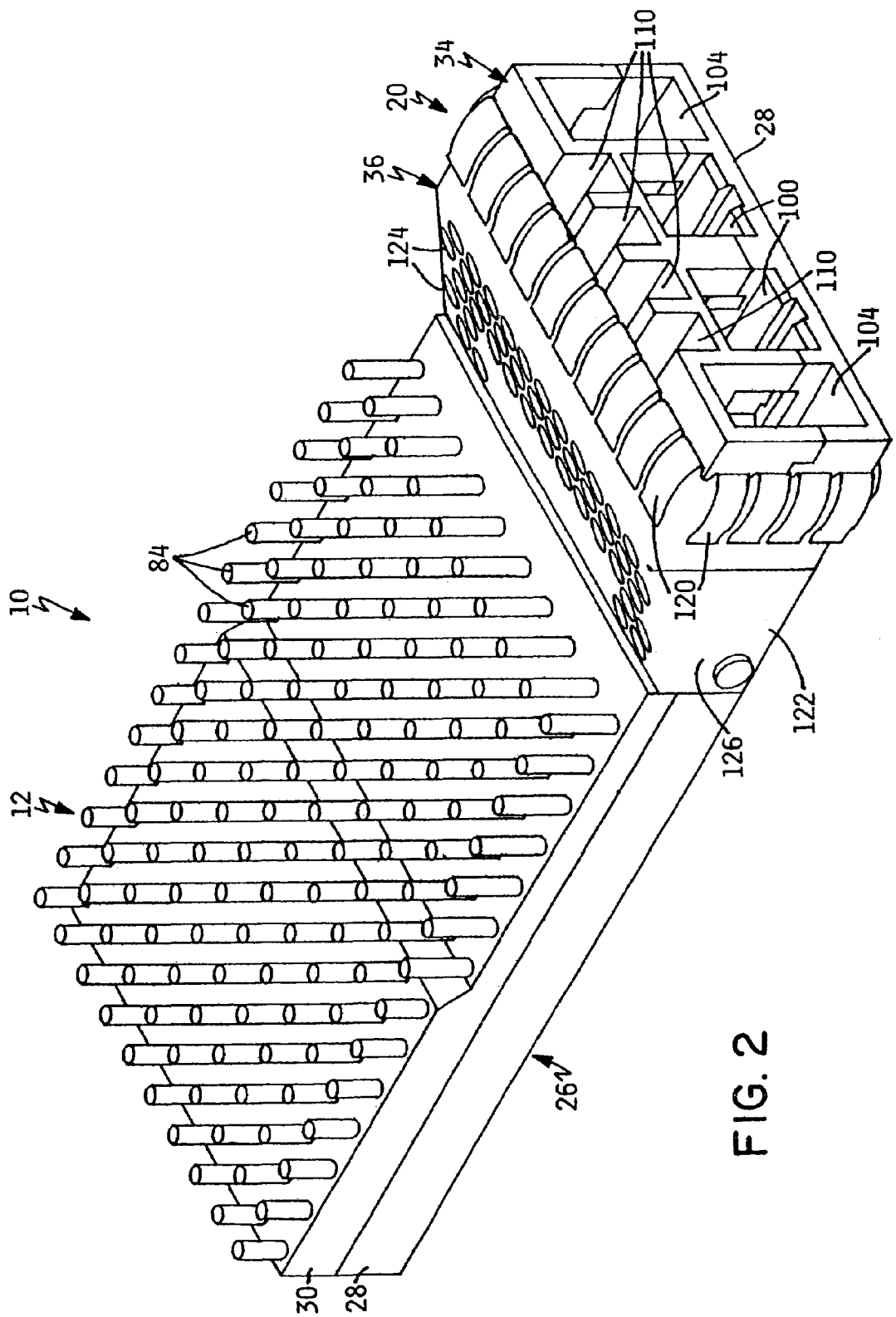
FIG. 2 is a perspective view of the optical transceiver module as illustrated in FIG. 1.
Figure 3:
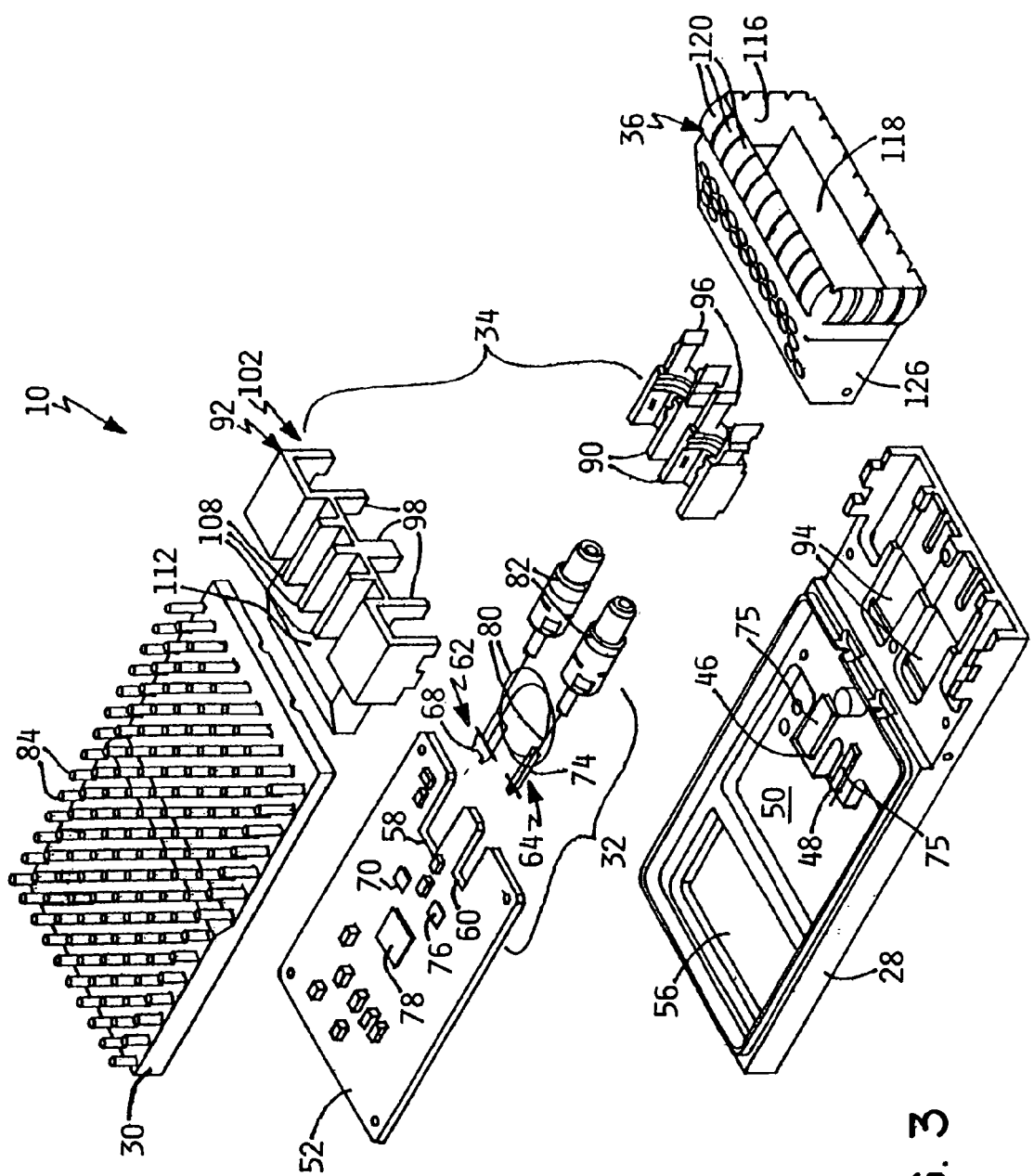
FIG. 3 is an exploded perspective view of the module shown in FIGS. 1 and 2.

Reference is made to FIGS. 2–3, which depict the optical transceiver module 10 comprising, in essence, a housing assembly 26 including a carrier member 28 mated to a heat dissipating apparatus or heat sink cover member 30; an optical subassembly 32; an optical retaining unit or assembly 34; and, an electromagnetic interference (EMI) assembly or unit 36. Initial reference is made to the carrier member 28 that has, preferably, an integral construction with a rectangular shape and is made of a suitable material for use in such transceivers. The thickness of the walls of the carrier member and heat sink cover member are selected to ensure generally uniform heat dissipation yet maintain electromagnetic interference integrity. Preferably, such a material serves to dissipate heat and acts as a shield for reducing the emissions of undesired EMI. Ideally, the carrier member 28 is made of a low cost, die-cast metal, such as aluminum metallized with nickel silver. Also, the carrier member 28 can be made of other appropriate materials that will achieve the foregoing functions. Examples of such other carrier materials include but are not limited to copper, silver and zinc. Besides a nickel silver plating other suitable metals, such as silver or gold can be used for plating the aluminum.

Figure 4:
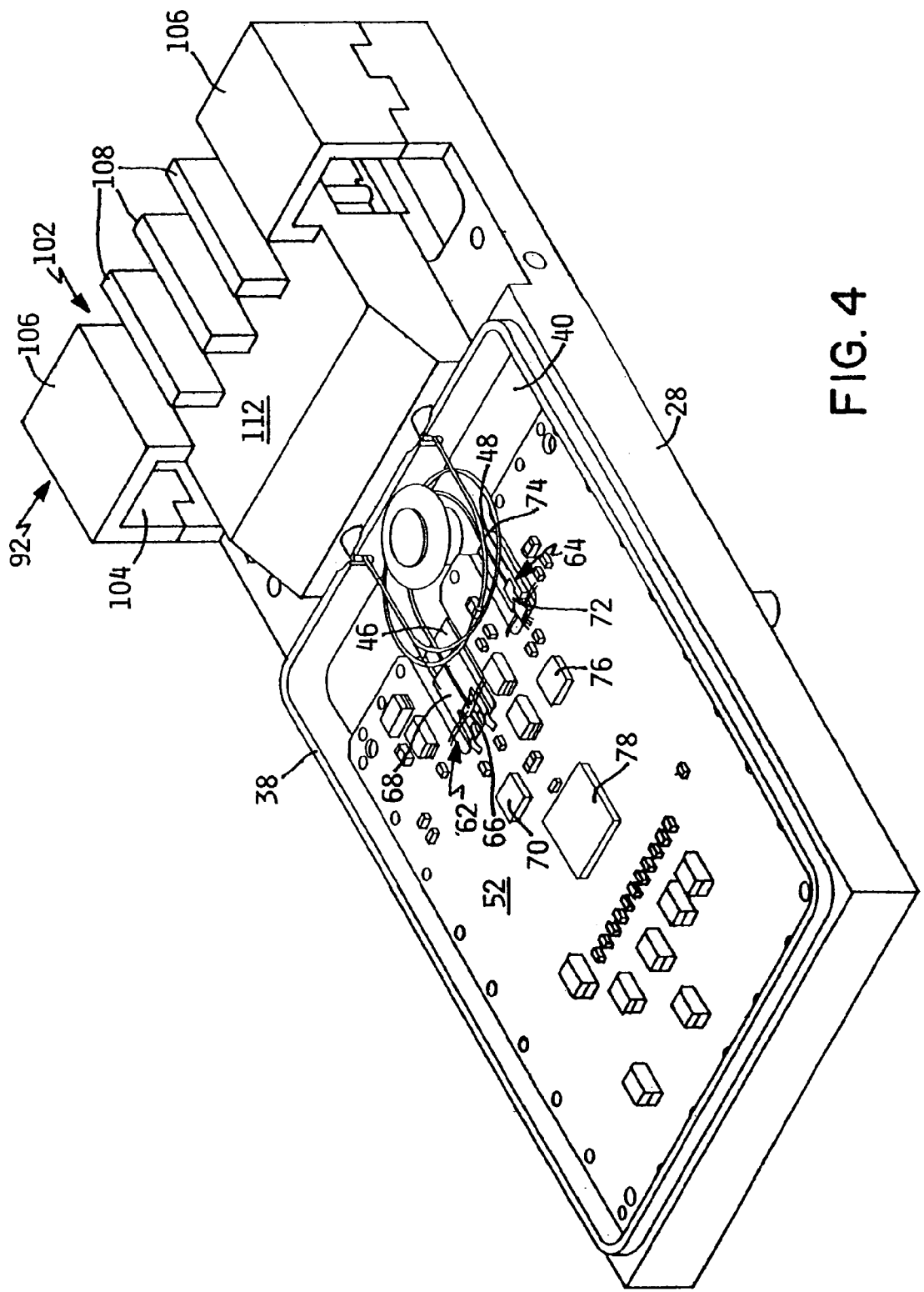
FIG. 4 is a perspective view of the module shown in FIGS. 1–3 with a heat sink cover removed for clarity.
Figure 5:
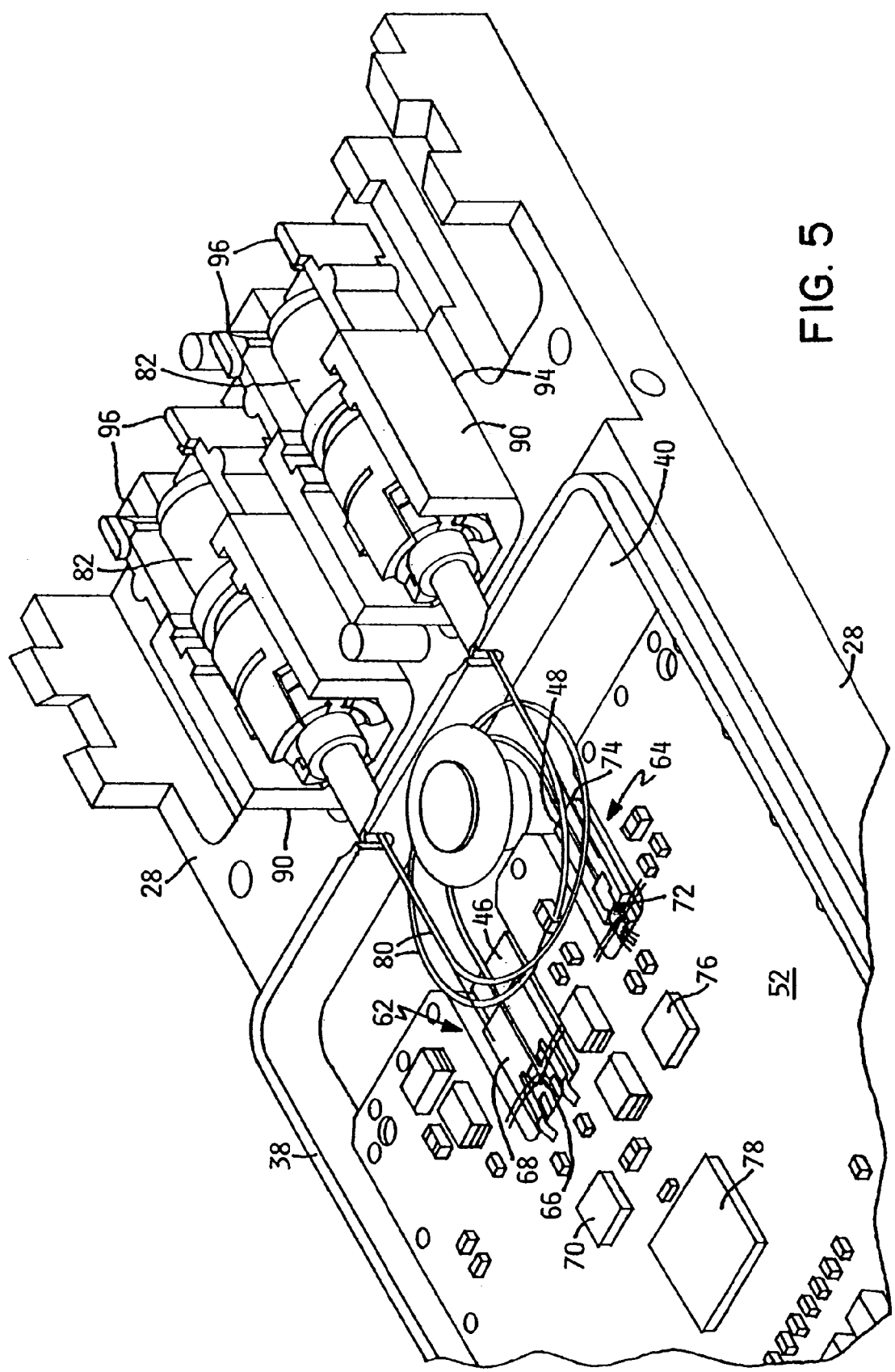
FIG. 5 is an enlarged and fragmented perspective view of the module illustrated in FIG. 4 with other components removed for additional clarity.
Figure 6:
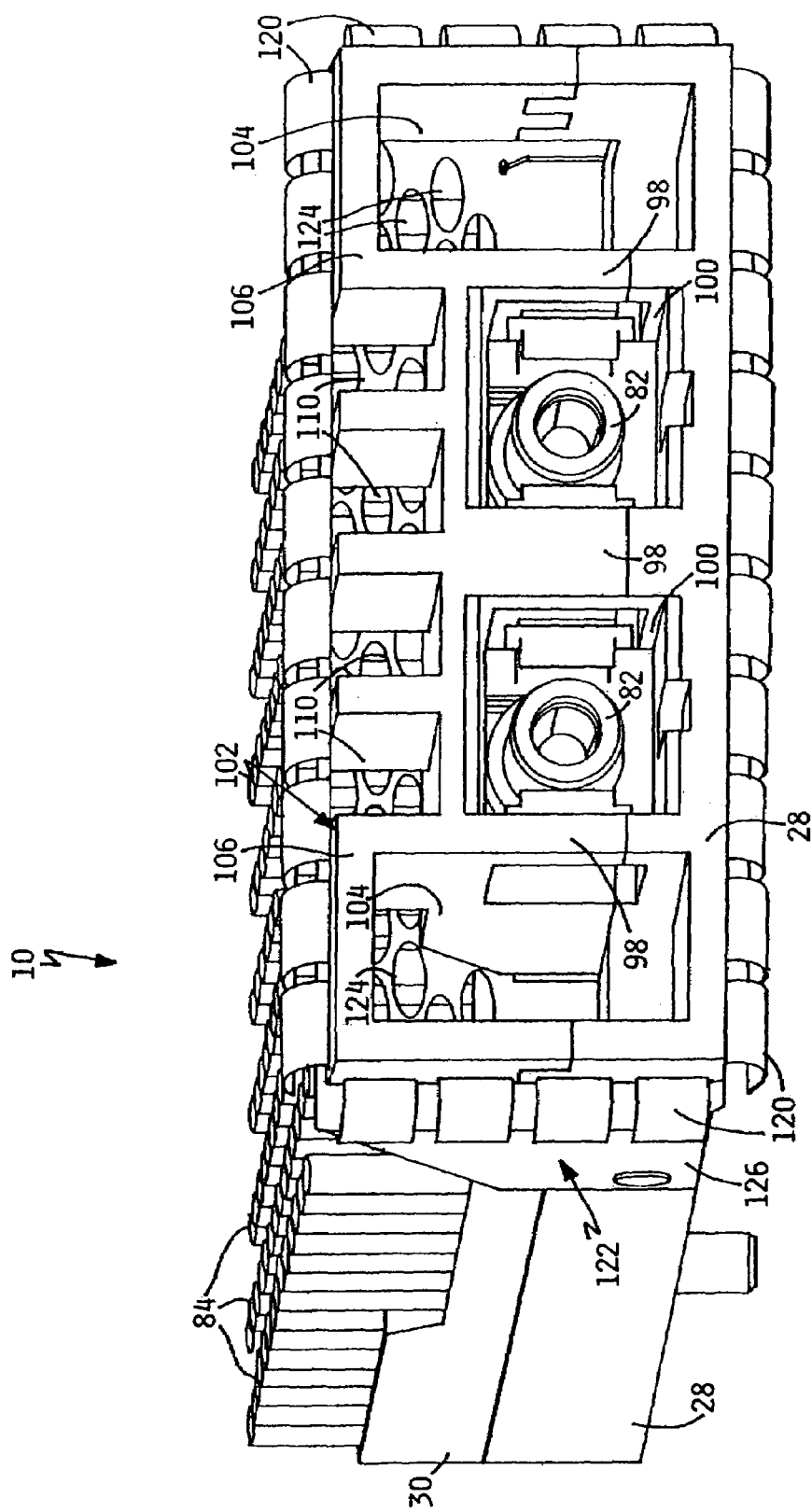
FIG. 6 is a perspective end view of the transceiver module.

As seen in FIGS. 3–5, the carrier member 28 has an upstanding peripheral lip or wall 38 that surrounds and, in part, defines an enclosure 40 which is a space between the carrier member 28 and the heat sink cover member 30. The wall 38 fits snugly within a corresponding and complementary shaped recess 42 formed in a bottom wall 44 (FIG. 8) of the heat sink cover member 30 to maintain EMI integrity. A pair of spaced apart and generally parallel pedestals 46 and 48 are raised from an enclosure floor surface 50.

Figure 7:
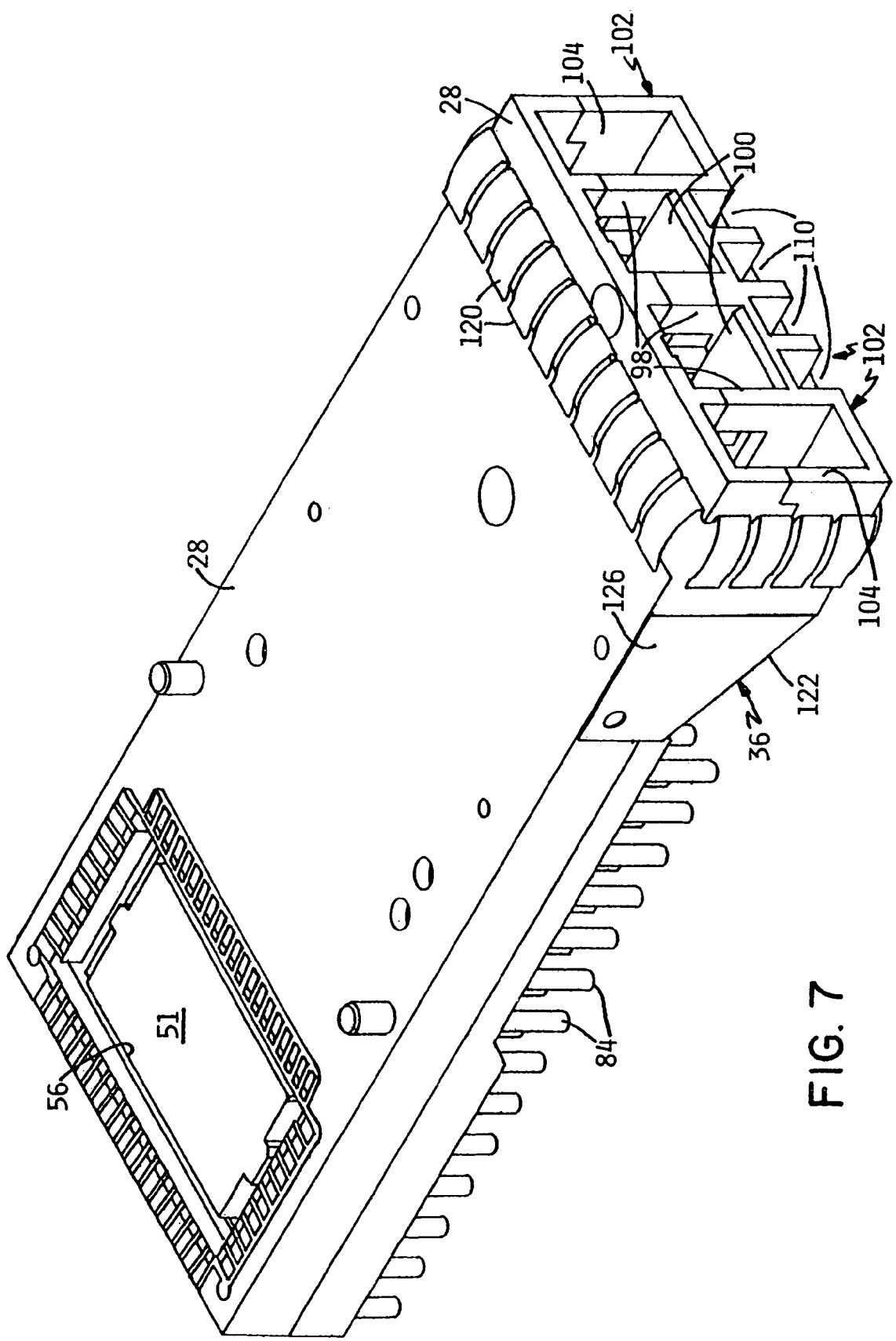
FIG. 7 is a perspective bottom view of the transceiver module.

Reference is made to the optical subassembly 32 that includes a printed circuit board member 52 that is sized and configured to be mounted within the enclosure on the floor surface 50. The printed circuit board may comprise any suitable type of rigid or a flexible type substrate. A conventional pin connector 51, as seen in FIG. 7, is on the bottom of the circuit board member and is registered with a rectangular opening 56 formed in the carrier member so as the pin connector can be attached to the host card in a known manner. The printed circuit board member 52 is formed with a pair of generally parallel and spaced apart cutouts 58 and 60. Each of the cutouts 58, 60 receives a respective one of the pedestals 46 and 48; respectively.

An electro-optical transmitter subassembly (TOSA) unit 62 and an electro-optical receiver subassembly (ROSA) unit 64 are mounted on the pedestals 46 and 48; respectively. Both the TOSA and ROSA units do not, per se, form an aspect of the present invention. Hence, a detailed description thereof is not necessary for understanding this invention. However, only those portions necessary for understanding this invention will be described. In this embodiment, the TOSA unit 62 includes an electronic component, such as a laser diode 66 (FIG. 4) that is directly mounted on a silicon optical bench 68 and is wired to an electronic device, such as a laser driver chip 70 mounted on the circuit board 52. The laser driver chip 70 tends to operate at temperatures of about 100 C. This temperature value is in a range that is significantly higher than an operational temperature value of the laser diode 66 (e.g., 70 C) which is in a temperature range that is lower than the noted driver chip range. Without the advantages of this invention, the higher temperatures of the chip 70 can adversely affect performance of the laser diode; with the latter operating out of its optimal performance range. The ROSA unit 64 includes an optical receiver 72 (FIG. 4) mounted on a silicon optical bench 74 and is wired to an optical amplifier chip 76 on the printed circuit board. Both the TOSA and ROSA units are, in turn, wired to a SERDES (serial/deserializer) chip 78; the latter of which also tends to optimally perform in a temperature range that is higher than that of the laser diode. The silicon optical benches 68 and 74 are, in turn, correspondingly mounted on and secured to the pedestals 46 and 48; respectively. Preferably, this is accomplished by a layer 75 (FIG. 3) of a thermally and electrically conductive adhesive material that has been applied in a known manner. The material for the layer is a silicone adhesive grease, such as JM 9000 which is used for bonding electronic parts where high heat transfer is required. This material is commercially available from General Electric. The thermal adhesive layer 75 in this embodiment can have a thickness of about 0.001 inches. Clearly, other thicknesses are contemplated. Whichever materials and thickness are selected they should have thermal conductivities in a range which conducts heat from the laser diode so as to assist in maintaining the latter at its optimal temperature operating range. For example, thermal conductivity can be in a range that is greater than 180 watts/mT; wherein m represents meters and T represents temperature in Kelvin. In this embodiment, other values of thermal conductivity can be used, such as 200 watts/mT. Accordingly, cooling of the TOSA and ROSA units is effected by thermal conduction to the carrier member the latter of which is also kept exposed externally to ambient as shown so as to enhance cooling.

It will be further noted that the laser diode 66 and the silicon optical bench 68 of the TOSA unit 62 by being mounted on the pedestal 46 of the carrier instead of the printed circuit board is not heated directly from the board by the heat generating electronic components, such as the SERDES 78, amplifier 76, and driver 70. Likewise, the components of the ROSA unit 64 by being mounted on the pedestal 48 do not have the heat of such components directly affecting them. The foregoing described construction allows a relatively inexpensive yet effective approach for cooling the components, such as the TOSA and ROSA units that should be operated at lower temperatures than temperatures generated by the chips on the printed circuit board. Also, it will be noted that this cooling is enhanced by reason of the carrier member extending beyond the wall.

Continued reference is made to FIGS. 3–5, wherein a looped optical fiber 80 extends from a respective one of the TOSA and ROSA units. Each of the optical fibers 80 cooperate with a SC optical coupler 82 that optically couples the optical fibers to the SC connector. It will be appreciated that the optical couplers can be of the SC or LC type. Details of the optical fibers 80 and their cooperation with the optical couplers 82 do not form a part of the present invention, but are described more completely in copending U.S. Ser. No. 09/809,531 entitled: TECHNIQUE AND APPARATUS FOR COMPENSATING FOR VARIABLE LENGTHS OF TERMINATED OPTICAL FIBERS IN CONFINED SPACES; and, U.S. Ser. No. 09/809,650 entitled: AN OPTICAL FIBER COUPLER AND AN OPTICAL FIBER COUPLER INCORPORATED WITHIN A TRANSCEIVER MODULE.

The heat sink cover member 30 is a heat dissipating apparatus that essentially functions to transfer heat from the heat generating electronics (e.g., Serdes, amplifier and laser driver) as well as shields against electromagnetic interference exceeding undesirable limits. In this embodiment, the heat sink cover member 30 is a generally thin and rectangularly shaped plate. It can be made of a variety of materials. Preferably they should be the same kind as the carrier member. In this embodiment, the heat sink cover member is made of an aluminum coated with nickel silver. A plurality of heat dissipating elements or fins 84 project from an external surface thereof and are deployed in the manner illustrated. The fins 84 are generally uniformly spaced apart relative to each other by a distance of about 5 mm from centerline to centerline so as to allow air flow therearound in any direction and in good cooling convective relationship with each other. Accordingly, this facilitates cooling of the module in a variety of host systems that force air therein for cooling in different directions. In addition, the noted fin spacing serves to minimize the build up of lint or other similar airborne debris on the module. Further in this regard, the noted spacing between the fins should generally not be less than about 2 mm before lint build-up becomes problematic. The fins 84 are tapered from bottom to top for enhancing the amount of surface area that can be used for heat dissipation. The present invention contemplates that the fins can have other configurations, spacings and heights. In fact, the fins need not substantially cover the upper surface area of the heat sink cover. The fins 84 can cover separate and distinct portions of the heat sink cover member, such as only those portions intended to receive the heat of the chips through conduction. Although it is ideal to have the fins made of the same material as the remainder of the cover such need not be the case. In this embodiment, the heat fins 84 terminate in a generally common plane and at a height that is preferably below the height profile imposed by an end user.

Figure 8:
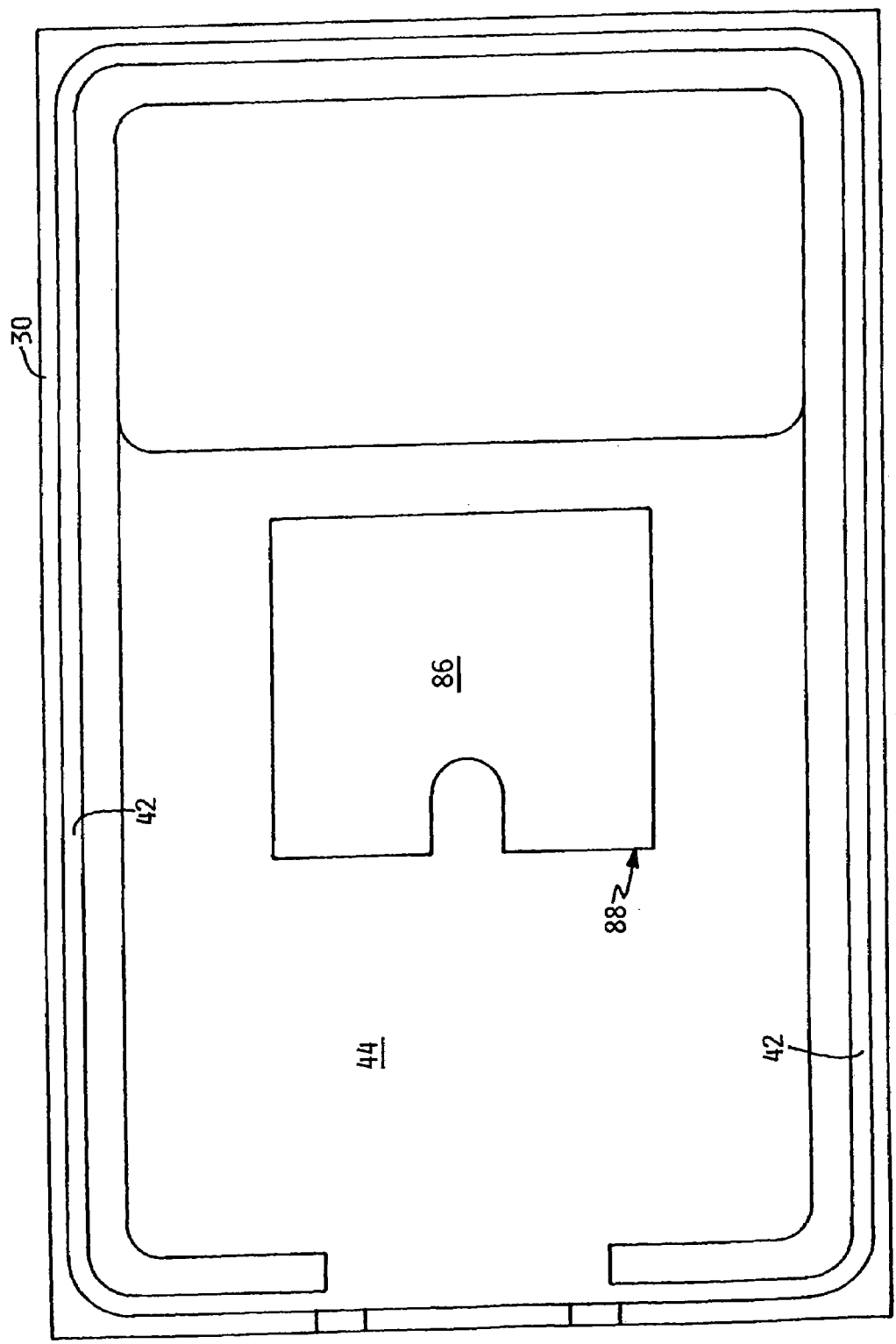
FIG. 8 is a plan view on an interior of a heat sink cover member of the module.

FIG. 8 depicts the bottom wall 44 of the heat sink member having a centrally disposed and integrally formed heat transfer pad 86 having a smooth and flat surface sized to at least cover the chips 70, 76 and 78 as well as be in close proximity thereto, for example, in the order of about 2 mils to 4 mils. A thermally conductive unit such as a thermal adhesive layer 88 generally uniformly covers the heat transfer pad 86. The thermal adhesive layer 88 mechanically and thermally couples the upper surfaces of the chips to the heat transfer pad 86. In this manner there is a greater likelihood that the laser diode 66 will remain at its desired operating temperature. Thermal conductivity of the thermal adhesive layer 88, in this embodiment, should be high and can exceed about 200 watts/mT. Other thermal conductivity ranges are envisioned depending on the temperatures that are generated by the components. The thermal layer 88 should be thick enough to accommodate manufacturing tolerance spacings between the pad and the chips. While the adhesive layer is thermally conductive, it is preferred that it need not be electrically conductive due to the desire to minimize electromagnetic interference that might otherwise be propagated through an electrically conductive material. For reliable operation, the thermal adhesive layer 88 should be mechanically compliant and due to the relatively flat surface of the transfer pad 86 the occurrence of bond lines in the adhesive layer 88 is minimized, thus decreasing the tendency of the adhesive to form air gaps therein which would hinder the transfer of heat. The thermal adhesive layer 88 can be made from a variety of materials including but not limited to silicone adhesives. In this embodiment, a type 6E3281 silicon adhesive commercially available from General Electric is used.

In this preferred embodiment, an optical retaining unit 34 comprises a pair of plastic optical ferrule coupler retainers 90 for removably retaining the optical couplers 82 and for being in covering relationship thereto a retainer cover member 92. Each of the optical ferrule coupler retainers 90 is mounted in a respective pocket 94 formed on the carrier member 28 and removably secures an optical coupler therein. The optical ferrule coupler retainers 90 are secured in place by the retainer cover member 92 that is appropriately secured to the carrier member. Details of the optical ferrule coupler retainers 90 do not form an aspect of the present invention, but are described in said copending U.S. patent application: U.S. Ser. No. 09/809,650. A pair of latches 96 protrude axially from one end of the optical ferrule coupler retainers 90 and facilitate a snap-fit connection with respective ends (not shown) of, for instance, a push-pull, duplex SC connector, whereby the latter are properly registered to the former for data transmission as is known in the data transmission field.

Referring back to FIGS. 1, 2, 6 & 7, the retainer cover member 92 is seen to have a unitary construction made of an electrically conductive material that primarily serves to shield against EMI, but also serves to conduct heat. The retainer cover member 92 in this embodiment is made of aluminum coated by nickel silver so as to be suitable for EMI shielding and heat conduction. Other suitable materials can be used. While a unitary construction is shown, such need not be the case. The retainer cover member 92 is secured to the carrier member as by fasteners (not shown) and includes a first set of wall structures 98 that are spaced apart and depend from a central member. These wall structures 98, in combination, with the carrier member 28 and the latches 96 define a pair of lateral electrical connector ports 100 for allowing receipt of appropriate portions of a push-pull, duplex SC connector.

The retainer cover member 92 also includes a second set of structures 102 that, in combination, with the carrier member 28 define respective air vents as will be described. In this embodiment, the second set of structures 102 includes a pair of laterally extending and generally U-shaped side arms 106 which cooperate with upstanding wall portions on the carrier member 28 as illustrated for defining air vents 104 that are laterally disposed adjacent to the connector ports 100 and extend from the plane of the wall. The air vents 104 allow bidirectional passage of air therethrough, whereby air can easily pass in a generally longitudinally extending path over a substantial surface portion of the module. This facilitates greatly the ability of cooler ambient air outside the data system passing thereinto. Since the external air is cooler, it will also facilitates improved cooling of the module not to mention the internals of the data system. The second set of structures 102 includes a plurality of upstanding and spaced apart heat radiating fins 108 which define air vents 110 that function in a similar manner as the vents 104. The sizing of the vents can depend on the quantity of air flow therethough. While the present embodiment illustrates a plurality of discrete vents surrounding a portion of the connector ports, it is within the spirit and scope of the present invention to have a single opening completely surrounding all or part of the connector ports. While the vents are, preferably, positioned over the optical subassembly end of the module which is generally warmer, the vents could be positioned adjacent the proximal end of the module. Moreover, the present invention contemplates that the vents can have other configurations. For example, instead of each vent having a rectangular configuration, other geometric configurations can be used. The retainer cover member 92 includes a hood portion 112 that encloses the optical couplers and serves to reduce the EMI as well as enhance heat transfer in this region of the module.

Reference is now made to the electromagnetic interference assembly or unit 36 that releasably retains the distal end of the module in the opening 24 and serves as a shield against EMI emissions. In this embodiment, the electromagnetic interference assembly or unit 36 comprises an integral construction having a generally rectangular frame 116 defining a corresponding opening 118 sized to receive slidably therein one end of the module. A plurality of spaced apart and flexibly resilient retaining tabs 120 extend from the frame 116 and are bent so that their distal ends face rearwardly. The tabs 120 are adapted to engage the wall for releasably retaining the module thereto, whereby portions of the carrier member, the retainer as well as the electromagnetic interference assembly are external relative to the wall so as to be even better exposed to cooler ambient air. As a result, an even better heat sink relationship is formed which operates at temperatures lower than those heat sink portions of the module mounted within the wall opening. The electromagnetic interference assembly is coupled to at least peripheral portions of the second set of structures and at least peripheral portions of the first end portion of the carrier member for releasably coupling the optical transceiver to the wall opening.

A screen assembly 122 is integrally coupled to the frame 116 in a flexibly resilient manner and is biased in a given angular orientation to the frame for shielding the wall opening, an end of the transceiver, and the vents. The screen assembly 122 includes a plurality of generally circular openings or vents 124 that are sized and spaced for controlling electromagnetic interference emissions and for allowing air flow to the vents 104 and 110 to allow the passage of air over the surface of the module. When the electromagnetic interference unit 36 is slid over the module the screen assembly 122 bends slightly due to inherent biasing thereof relative to the retainer member 92 to place its openings or vents 124 at an oblique angular orientation, such as shown, relative to a vertical plane containing the vents 104 and 110. The oblique orientation of the screen assembly 122 facilitates a presentation of a greater number of the vents 124 in the path of the air passing through the vents 104 and 110; in comparison to the number of vents presented if they are generally parallel to a vertical plane including the vents 104 and 110. The size of each vent 124 is such as to not only facilitate air flow, but also limit EMI emissions. In this embodiment, the each of the vents 124 has a diameter size of about 2 mm to about 3 mm. Other sizes are contemplated, such as 3 mm to about 6 mm. The screen assembly 122 does not have an opening over the portion thereof that is in overlying relationship to the hood portion 112. The screen assembly 122 has lateral flaps 126 that are joined to the sides of the carrier member 28. The electromagnetic interference unit 36 is, preferably, an integral piece that is made of aluminum plated with a nickel silver as are the other components of the module for heat dissipation and EMI reasons. While a screen assembly is shown, EMI blocking can be accomplished with a solid member covering the vents 104 and 110. Also, the screen need not be at an oblique angle but can be placed parallel to a vertical plane containing the vents 104 and 110. While the retainer and the screen unit are two pieces, the present invention contemplates that they can be one unit.

Accordingly, there is provided a method of cooling an optical transceiver that is mountable to an opening in a wall. The method comprises the steps of: providing an optical transceiver having at least one end portion that is insertable within the wall opening; and, ventilating ambient air over a major portion of the transceiver by mounting the one end portion to a wall so that at least one vent is formed within confines of the wall opening which allows air to pass therethrough and over the transceiver. Ventilating can be achieved passively or with the use of circulating devices (not shown) within the data transfer system.

The embodiments and examples set forth herein were presented to best explain the present invention and its practical application and to thereby enable those skilled in the art to make and use the invention. However, those skilled in the art will recognize that the foregoing description and examples have been presented for the purposes of illustration and example only. The description set forth is not intended to be exhaustive or to limit the invention to the precise forms disclosed. Many modifications and variations are possible in light of the above teachings without departing from the spirit and scope of the appended claims.

What is claimed is:

1. An optical transceiver comprising:
   a housing assembly including a carrier member and a heat sink cover member coupled to a portion of said carrier member to define at least a portion of an enclosure therewith;
   an optical subassembly including an electro-optical transmitter unit positioned within said enclosure;
   a retainer assembly mounted on a first end portion of said carrier member and enclosing portions of said optical subassembly;
   said retainer assembly including a first set of structures which, in combination, with said carrier member define at least one electrical connector port for allowing connection of an electrical connector to said optical subassembly;

said retainer assembly including a second set of structures which, in combination, with said carrier member define at least one vent surrounding portions of said connector port, said vent allows bidirectional passage of air therethrough, whereby air can easily pass generally over a substantial surface portion of said housing assembly; and, an electromagnetic interference assembly connected to at least peripheral portions of said second set of structures and at least peripheral portions of said first end portion for releasably coupling said optical transceiver to an opening of a wall.

2. The optical transceiver of claim 1 wherein said electromagnetic interference assembly includes a frame having a plurality of spaced apart and flexibly resilient retaining tabs extending therefrom, said tabs allowing said optical transceiver to be inserted into a wall opening and releasably retained thereby with a wall defining the wall opening, said electromagnetic interference assembly is made of an electrically conductive material which reduces electromagnetic interference emissions of said optical transceiver.

3. The optical transceiver of claim 2 further including a screen assembly coupled to said optical transceiver so as to be positioned adjacent to and covering at least a portion of said vent, said screen assembly being made of a material that reduces electromagnetic interference and is coupled to said frame and is adapted to be positioned adjacent to and covering at least a portion of said vent defined by the optical transceiver and the wall, said screen assembly having a plurality of screen openings for allowing passage of air therethrough and reducing emission of electromagnetic interference.

4. The optical transceiver of claim 3 wherein said screen openings are sized and spaced for controlling electromagnetic interference emissions and for allowing air flow to said vent.

5. The optical transceiver of claim 3 wherein said screen assembly is integrally coupled to said frame in a flexibly resilient manner and is biased in a given angular orientation thereto so that said screen assembly presents relatively more of said openings to said vent than would otherwise be presented if said openings were in a plane parallel to said vent.

6. The optical transceiver of claim 1 further including a plurality of heat dissipating elements extending from said heat sink cover member, said heat dissipating elements being spaced apart from each other by a sufficient distance so as to minimize trapping of airborne debris thereby.

7. The optical transceiver of claim 1 wherein said second set of structures include a pair of laterally extending arms which cooperate with said carrier member to define a corresponding pair of lateral vents positioned adjacent said connector port and at least an upper vent above said connector port between said lateral vents.

8. The optical transceiver of claim 1 wherein said electro-optical transmitter unit includes a first electronic device which operates at a first temperature range and a second electronic device which operates at a second temperature range that is different from said first range; said first electronic device being thermally coupled to an internal surface of said carrier member so as to transfer heat thereof by conduction to said carrier member, and said second electronic device being mounted on a substrate located within said enclosure which substrate is not in direct thermal contact with said carrier member; and, a thermally conductive unit coupling said second electronic device to an internal wall of said heat sink cover member in a manner so as to transfer heat by conduction from said second electronic device to said heat sink cover member and away from said first electronic device.

9. A data transfer system including a wall having an access opening and an adapter card assembly, in combination with an optical transceiver which is mounted to said wall access opening, said optical transceiver comprising: a housing assembly including a carrier member and a heat sink cover member coupled to a portion of said carrier member to define at least a portion of an enclosure therewith; an optical subassembly including an electro-optical transmitter unit positioned within said enclosure; a retainer assembly mounted on a first end portion of said carrier member and enclosing portions of said optical subassembly; said retainer assembly including a first set of structures which, in combination, with said carrier member define at least one electrical connector port for allowing connection of an electrical connector to said optical subassembly; said retainer assembly including a second set of structures which, in combination, with said carrier member define at least one vent surrounding portions of said connector port, said vent allows bidirectional passage of air therethrough, whereby air can easily pass generally over a substantial surface portion of said housing assembly, and, a electromagnetic interference assembly connected to at least peripheral portions of said second set of structures and at least peripheral portions of said first end portion for releasably coupling said optical transceiver to the access opening.

10. The system of claim 9 wherein said electromagnetic interference assembly includes a frame having a plurality of spaced apart and flexibly resilient retaining tabs extending therefrom, said tabs allowing said optical transceiver to be inserted into the access opening and releasably retained thereby with the wall, said electromagnetic interference assembly is made of an electrically conductive material which reduces electromagnetic interference emissions of said optical transceiver.

11. The system of claim 10 further including an electrically conductive screen assembly coupled to said frame positioned adjacent to and cover at least a portion of said vent.

12. The system of claim 9 further including a plurality of heat dissipating elements extending from said heat sink cover member, said heat sink dissipating elements being spaced apart from each other by a sufficient distance so as to minimize trapping of airborne debris thereby.

13. An optical transceiver comprising:

a housing assembly including a carrier member and a heat sink cover member joined together to define a portion of an enclosure therebetween;

an optical subassembly within said enclosure, said optical subassembly comprising an electro-optical transmitter unit including a first electronic device which operates at a first temperature range and a second electronic device which operates at a second temperature range that is higher than the first temperature range;

said first electronic device being thermally coupled to an internal surface of said carrier member so as to transfer heat thereof by conduction to said carrier member, and said second electronic device being mounted on a substrate located within said enclosure which substrate is not in direct thermal contact with said carrier member; and, a thermally conductive unit coupling said second electronic device to an internal wall of said heat sink cover member in a manner so as to transfer heat by conduction from said second electronic device to said heat sink cover member and away from said first electronic device, whereby the first electronic device is maintained cooler than the second electronic device.

14. The optical transceiver of claim 13 further comprising:
a retainer assembly mounted on a first end portion of said carrier member and enclosing portions of said optical subassembly;
said retainer assembly including a first set of structures which, in combination, with said carrier member define at least one electrical connector port for allowing connection of an electrical connector to said optical subassembly;
said retainer assembly including a second set of structures which, in combination, with said carrier member define at least one vent surrounding portions of said connector port, said vent allows bidirectional passage of air therethrough, whereby air can easily pass generally over a substantial surface portion of said housing assembly; and,
an electromagnetic interference assembly connected to at least peripheral portions of said second set of structures and at least peripheral portions of said first end portion for releasably coupling said optical transceiver to an opening of a wall.

15. The optical transceiver of claim 14 wherein said thermally conductive unit comprises a thermally conductive adhesive material which has reduced electrical conductivity properties for inhibiting the transfer of electromagnetic interference.

16. The optical transceiver of claim 14 wherein said electromagnetic interference assembly is made of an electrically conductive material which reduces electromagnetic interference emissions of said optical transceiver and includes a frame having a plurality of spaced apart and flexibly resilient retaining tabs extending therefrom, said tabs allowing said optical transceiver to be inserted into a wall opening and releasably retained thereby with a wall defining the wall opening.

17. The optical transceiver of claim 14 further including an electrically conductive screen assembly coupled to said optical transceiver positioned adjacent to and covering at least a portion of said vent.

18. An optical transceiver comprising:
a housing assembly including a carrier member and a heat sink cover member joined together to define a portion of an enclosure therebetween;
an optical subassembly within said enclosure, said optical subassembly comprising an electro-optical transmitter unit including a laser diode which operates at a first temperature range and a laser driver which operates at a second temperature range that is different from said first range;
said laser diode being thermally coupled to an internal surface of said carrier member so as to transfer heat thereof by conduction to said carrier member, and said laser driver being mounted on a substrate located within said enclosure which substrate is not in direct thermal contact with said carrier member; and,
a thermally conductive unit coupling said laser driver to an internal wall of said heat sink cover member in a manner so as to transfer heat by conduction from said laser driver to said heat sink cover member and away from said laser diode, whereby the laser diode is maintained cooler than the laser driver.

19. An electromagnetic interference apparatus for use in combination with an optical transceiver having a housing assembly including an end portion with a vent which allows air to flow therethrough, said electromagnetic interference apparatus is made of a material which reduces electromagnetic interference emissions, said electromagnetic interference apparatus comprising:
a frame;
a plurality of spaced apart and flexibly resilient retaining tabs extending from said frame, said tabs allowing the optical transceiver to be inserted into a wall opening for releasably retaining the optical transceiver within the wall opening; and,
a screen assembly coupled to said frame so as to be positioned adjacent to and covering at least a portion of the vent, said screen assembly including a plurality of screen openings which allow passage of air therethrough and reduce emissions of electromagnetic interference.

20. The apparatus of claim 19 wherein said screen assembly is angularly oriented relative to a generally longitudinal flow path of air through the vent so as to increase the number of said screen openings which can pass air therethrough relative to a number of said screen openings which could pass air if said screen openings were generally parallel to a vertical plane of said vent.

* * * * *